2,931,784
Patented Apr. 5, 1960

2,931,784

POLYESTER-VINYLIDENE MONOMER COMPOSITION CONTAINING A METAL SALT AND AN ORGANIC ACID CHLORIDE AND PROCESS OF POLYMERIZING SAME

Kenneth W. Raymond, Whittier, Calif., assignor to General Electric Company, a corporation of New York No Drawing. Application May 15, 1957
Serial No. 659,209

10 Claims. (Cl. 260—45.4)

This invention relates to the acceleration of the rate of polymerization of polyester resins. More specifically this invention relates to accelerating the rate of polymerization of a substantially non-aqueous polymerizable system comprising an unsaturated alkyd, a polymerizable monomer containing ethylenic unsaturation and a peroxide catalyst, by incorporating in said system a trace amount of certain metallic compounds and an organic acid halide.

It is known that polyester systems comprising unsaturated alkyds and polymerizable monomers containing ethylenic unsaturation, e.g., styrene, may be catalyzed with peroxide catalysts. However, these polyester systems are normally slow to polymerize and cure in the presence of such catalysts, and for many applications this rate of polymerization is a great disadvantage.

It is also known that certain substances, when added to the polyester system, will accelerate this rate of polymerization. However, these polyester systems are non-aqueous and to achieve a controlled acceleration, the accelerator should be substantially soluble in the polyester system.

Moreover, in addition to the desirability of achieving a controlled acceleration, the additive material must not deleteriously affect the color, pot life, weatherability or other physical and chemical properties of the cured or uncured polyester.

In accordance with the present invention, it has been discovered that polyester systems comprising an unsaturated alkyd and a polymerizable monomer may be polymerized at an accelerated rate of polymerization with certain additive materials which are substantially soluble in the polyester system and which do not deleteriously affect other desirable characteristics of the polyester. In many instances, the final properties of the cured product are enhanced.

Briefly stated, the present invention involves the discovery that the rate of polymerization of a substantially non-aqueous polymerizable system comprising (1) the reaction product of (a) an alpha unsaturated, alpha, beta polycarboxylic acid or anhydride and (b) a dihydric alcohol and (2) a polymerizable monomer containing ethylenic unsaturation may be greatly accelerated by carrying out said polymerization in the presence of (3) a peroxide catalyst, and (4) an accelerator comprising (a) a trace amount of an organic compound of an iron group metal, copper, manganese, zinc or silver and (b) an organic acid halide.

Because the accelerators of the present invention, comprising a metallic compound and an organic acid halide, are soluble in the polymerizable polyester system, the desired rate of acceleration of polymerization of the polyester system may be accurately controlled. The reason for this is that the accelerators, being soluble in the polyester system, can be added at a concentration selected for the desired rate of polymerization. Acid chloride concentration can also be varied to give shorter gel time and longer cure or vice versa. If the accelerators were not soluble in the polyester systems, the acceleration would normally be sudden and uncontrollable. An addition of any amount of the accelerator would immediately react and trigger the polymerization so that very little control could be exercised over the rate of polymerization except the limited control possible by varying the amount added.

In addition to controlling the rate of polymerization, it has also been discovered that the accelerator systems of this invention produce a polyester product which is fully as satisfactory as the polyester produced by prior methods. In some cases, the properties of the polyester are, in fact, superior. As an example, weatherability and light stability of the cured product are generally superior to the same polyesters cured in the absence of an accelerator. Moreover, the resistance of the cured product to water is greater than prior products. The reasons for the foregoing advantages are believed to reside in the fact that a more complete polymerization of the polyester is achieved. Thus, for example, discoloration by ultraviolet light causing degradation to occur at unreacted vinyl and ethylenic unsaturation will be minimized. The decreased sensitivity to water is a result of the polymerization of the polyesters at a proper rate resulting from the control possible through the use of the aforementioned accelerators. An additional advantage of the accelerator systems of this invention is that they are effective at very low concentrations and are, therefore, economical. Moreover, it has been found that they do not affect in a deleterious manner additive materials, such as pigments, which may be present in combination with the polyesters. In addition, the polyester systems of this invention have been found to have excellent pot life in combination with the above-mentioned accelerator.

The polyester systems whose rate of polymerization is accelerated in accordance with this invention are well known to the art and are described, for example, in U.S. Patent 2,443,741 to Kropa. The unsaturated alkyd portion of the polyester system is generally prepared by the reaction of an alpha unsaturated, alpha, beta polycarboxylic acid or anhydride with a glycol. Typical examples of polybasic acids and anhydrides which may be used to prepare the unsaturated alkyds are maleic, fumaric, itaconic, aconitic, mesaconic, citraconic, ethyl maleic, d.chloromaleic, 3,6-endomethylene terahydrophthalic and hexachloroendomethylenetetrahydropnthalic acid or anhydride. The foregoing polybasic acids or anhydrides may be esterified with such dihydric alcohols as ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, 1,5-pentanediol. The above polyesters may be modified by adding to the esterification reaction other modifying polybasic acids or anhydrides, such as, for example, phthalic, terephthalic, isophthalic, oxalic, malonic, succinic, adipic, suberic, azelaic, and sebacic acids and anhydrides or their derivatives, such as the halogenated substituted derivatives of the aforementioned acids or anhydrides, an example of which is terachlorophthalic acid.

The polymerizable monomer containing ethylenic unsaturation which forms a necessary ingredient of the polyester systems included within the scope of the present invention is likewise well known in the art and is also more fully described in the aforementioned Kropa Patent 2,443,735 and in Patent 2,407,479 to D'Alelio, assigned to the assignee of the present invention. Typical polymerizable compounds containing ethylenic unsaturation include the various polymerizable monomers containing vinyl or vinylidene groups, for example, styrene, halogenated substituted styrene, divinyl benzene, acrylic and methacrylic acids and their derivatives, including the nitriles, the amides and the esters of said acids; indene; vinyl heterocyclic compounds, such as vinyl pyrrolidone; aliphatic and aromatic allyl, diallyl and triallyl compounds, such as allyl acetate, diallyl phthalate, diallyl isophthalate; inorganic allyl compounds, such as triallyl phosphate, etc. In addition, the polymerizable compounds containing ethylenic unsaturation may be the esters of monohydric or polyhydric alcohols and unsaturated polymerizable monocarboxylic acids, such as acrylic and methacrylic acids. Also included are the esters of monohydric unsaturated alcohols, such as allyl vinyl or methallyl alcohol, with mono- or poly-basic acids, such as acetic, propionic or succinic acid. Moreover, the ethylenically unsaturated compound may also be an ester of an alpha unsaturated alpha, beta dicarboxylic acid, such as maleic, fumaric, itaconic, etc. and a monohydric alcohol, such as methyl, ethyl, propyl alcohol, etc.

The catalysts which may be used for catalyzing the reaction of the ingredients of the polyester systems of this invention are in general peroxide catalysts. Suitable examples of such catalysts include aliphatic acyl peroxides, e.g., acetyl peroxide, lauroyl peroxide, stearoyl peroxide, etc., peroxides of the aromatic or of the aliphatic-aromatic series, e.g., benzoyl peroxide, acetyl benzoyl peroxide, cumene hydroperoxide, various per-compounds such as tertiary butyl perbenzoate, tertiary butyl hydroperoxide, cyclohexylhydroperoxide, and other peroxide catalysts well known in the art. The quantities of the catalysts used will vary from about 0.1 to 5% of the weight of the polymerizable ingredients, i.e., the weight of the unsaturated alkyd plus the weight of the vinyl monomer. A preferred quantity of the catalyst is about 1%. The amount of the peroxide catalyst will vary depending, for example, on the particular polymerizable materials employed, products desired, temperature conditions and the desired end use of the final product.

The organic acid halides included within the scope of the present invention are substantially soluble in the above polyester resin systems. By diluting any of the organic acid halides of this invention with a non-reactive solvent such as xylene or toluene, or with well-known polyester plasticizers, the rate of polymerization can be even more accurately controlled. Thus, for a relatively slower acceleration, a dilute solution of the organic acid halide will be used, whereas if a rapid acceleration is desired, a concentrated or pure quantity of the organic acid halide can be employed. Examples of organic acid halides which may be utilized in the practice of this invention are the aliphatic acid halides such as acetyl, propyl and butyl chlorides; the halides of aliphatic dicarboxylic acids such as adipyl chloride, succinyl chloride or fumaryl chloride; aromatic acid halides such as benzoyl chloride, benzene sulfonyl chloride, phthalyl chloride, etc. The preferred acid halides are the aliphatic dicarboxylic acid halides above mentioned because of their complete solubility and their gel-cure characteristics.

The organic acid halides may be used in quantities of from about 0.001 to about 1.00% based upon the weight of the resinous matermials. A preferred quantity, however, is from about 0.025 to 0.5%. The upper limit for the inclusion of the organic acid ingredient is dictated by the fact that it has been found that in quantities over approximately 1.00%, most organic acid halides begin to inhibit rather than accelerate the cure of the polyesters.

The metallic compounds are an absolutely essential ingredient of the present accelerating system as will be more clearly brought out hereinafter. If these metallic compounds are sequestered and removed from the polyester, the organic acid halides will be ineffective for purposes of accelerating the cure of the polyester systems. The metallic compounds which are useful in the practice of the present invention are a metallic compound of an organic material. The non-metallic portion of the compound must be organic to insure solubility in the polyester. Pure metals themselves may actually be used to accelerate the polyester systems. When introduced in the form of the metal, they are probably solubilized by the action of the polyester system, such as by the carboxyl groups present in the system and end up as organic metallic compounds. However, if they are introduced in this state, the element of control heretofore stressed is lost. For the foregoing reason, it has been found necessary to introduce the metallic compounds in the form of their organic polyester soluble derivatives. The metallic compounds which may be used in the practice of the present invention are those compounds containing either an iron group metal, copper, manganese, zinc or silver. The foregoing metallic elements may be present in the polyester systems as the naphthenates, the octoates, the lino-resinates, the acetates, the maleates, as the salts of other aliphatic or aromatic mono- or polybasic acids, or in combination with other organic radicals soluble in the polyester systems. The preferred metallic constituent is, however, copper and preferably in the form of copper naphthenate.

Trace amounts as small as about 1 part per million of the metallic constituent are sufficient to accelerate in accordance with this invention. By parts per million, as hereinafter referred to, is meant parts by weight of the metallic constituent of the metal compound per million parts by weight of the resinous system, i.e., the polyester plus the monomer. The upper range for the inclusion of the trace quantities of the metallic compound is about 500 parts per million, and preferably not more than 100 parts per million. This upper range is again limited by the fact that the accelerating effect decreases at a certain point; over approximately 500 parts per million, the metallic compound actually inhibits rather than accelerates the polymerization. Although these quantities of the metallic constituent are extremely small, they are nevertheless critical.

It has also been found that under certain circumstances, even faster curing action can be achieved with the use of amines or amine salts in combination with the acid accelerators above mentioned. These amines may be primary, secondary, tertiary amines or amine salts, as well as quaternary amine salts. Suitable examples of amines are: ethylamine, 2-ethylhexylamine, aminobenzoic acid, phenyl ethyl ethanolamine, cyclohexylamine, phenyl hydrazine; dibutylamine, diethanolamine, diamylamine, diallylamine, dicyclohexylamine, triethanolamine, triethylamine, triethyltetramine, betain, amino pyridine, piccoline; dimethyl aniline; benzyl trimethyl ammonium chloride, octadecyl trimethyl ammonium chloride. The hydrochloride, hydrobromide or other hydrohalide salts of the primary, secondary and tertiary amines above mentioned may also be used in combination with the foregoing acid halides and metallic compounds. These amines may be added in quantities up to about 0.1% of the weight of the polymerizable system. In general, it is preferred to add the acid halide to the polyester, then the amine or amine salt. Results have indicated a difference in accelerating effect if they are added separately rather than in the form of their reacted mixture.

The following examples are illustrative of the practice of this invention. All parts are by weight.

EXAMPLE 1

The unsaturated alkyd portion of the polyester of this example was prepared from propylene glycol, maleic anhydride, phthalic anhydride in such proportions that the amount of glycol to maleate to phthalate was in a ratio of 2:0.75:1.25. The acid number of the alkyd portion of the polyester was 35. The alkyd portion consisted of approximately 62%, and styrene monomer consisted of approximately 38%, of the finished resin. The polyester system was inhibited with 0.005% of hydroquinone.

A series of tests were then run with resins produced in accordance with the above example. In each of these tests, a 50 gram sample of the above described resin was heated in 180° F. with a recording thermocouple. The initial temperature of the resinous mixture was 100° F. In the following Table A, the number of minutes is given for the resin to reach both the gel state and the cure state, the cure being measured by peak exotherm. The catalyst used in each of the following tests was 1% cumene hydroperoxide and 0.3% benzoyl peroxide. In each case, 2½ parts per million of copper naphthenate was incorporated. The results of these tests were as follows:

Table A

| Organic Acid Chloride Accelerator | Amount, Percent | Min. to Gel | Min. to Cure |
| --- | --- | --- | --- |
| 1. None | | 8 | 15 |
| 2. Acetyl Chloride | .025 | 4 | 9¾ |
| 3. Benzoyl Chloride | .25 | 4 | 8¾ |
| 4. Propionyl Chloride | .025 | 3 | 8 |
| 5. Fumaryl chloride | .25 | 3 | 7¼ |
| 6. Fumaryl chloride | .025 | 3¾ | 8 |
| 7. Fumaryl chloride | .0025 | 4½ | 10½ |
| 8. Phthaloyl chloride | .25 | 4 | 9 |
| 9. Benzoyl chloride | .50 | 3½ | 8¼ |
| 10. Benzene sulfonyl chloride | .0125 | 4½ | 10¾ |
| 11. Benzene sulfonyl chloride | .00125 | 3½ | 10½ |
| 12. Adipyl chloride | .05 | 3¾ | 7¼ |
| 13. Butyryl chloride | .05 | 4 | 8½ |
| 14. Caprylyl chloride | .025 | 3½ | 9 |
| 15. Thionyl chloride | .005 | 4½ | 10¼ |

In general, the above table shows that organic acid chlorides in combination with a metallic compound act as accelerators. Metallic compounds other than copper, including iron, nickel, cobalt, manganese and zinc were tested in trace quantities in a manner similar to the above and found to be useful as a component of the accelerator system.

In the following Table B, the resin of Example 1 was tested with the use of an acid chloride and an amine or amine salt in combination with copper naphthenate as an accelerator. The percentage of the copper compound and the catalyst was the same as that of Example 1.

Table B

| | Amine or Amine Salt and Organic Acid Chloride Accelerator | Amount, Percent | Min. to Gel | Min. to Cure |
| --- | --- | --- | --- | --- |
| 1 | None | | 8 | 15 |
| 2 | Di-N-Butylamine | .005 | 7½ | 14½ |
| 3 | Benzoyl chloride | 0.025 | 4½ | 10½ |
|   | dimenthyl aniline | 0.000875 | | |
| 4 | Benzoyl chloride | 0.0025 | 3½ | 8¾ |
|   | 4-(5 nonyl) Pyridine | 0.25 | | |
| 5 | Fumaryl Chloride | 0.025 | 2¼ | 7½ |
|   | Di-N-Butylamine | 0.005 | | |
| 6 | Benzoyl chloride | 0.025 | 2 | 5 |
|   | Dibutylamine | 0.05 | | |
| 7 | Benzoyl chloride | 0.0025 | 2½ | 6 |
|   | Pyridine | 0.25 | | |
| 8 | Fumaryl chloride | 0.05 | 2 | 5¼ |
|   | Triethylamine HCl | 0.05 | | |
| 9 | Adipyl chloride | 0.025 | 2 | 5¼ |
|   | Dicyclohexylamine | 0.01 | | |

In place of copper as the metallic ingredient of the organic compound, silver may be used in a manner similar to that set out above. Table B indicates that an acid halide plus an amine or amine salt accelerates the gel and cure time. It should be noted that in all cases, in both Tables A and B, the time from gel to cure is shortened over that of the polyester minus the accelerator. This is important to the fabricator of structural parts utilizing these polyesters because it speeds production. Moreover, as previously mentioned, by varying the concentration of the accelerator, optimum control of gel and gel to cure time may be selected. Zinc octoate, as the organic metallic compound, was tested in a manner substantially the same as that set out in Table B above with fumaryl chloride and triethylamine hydrochloride. The polyester of Example 1 was used as the polyester. Gel time was 2 minutes, cure time was 5½ minutes.

EXAMPLE 2

In this example a resin was prepared from propylene glycol, maleic anhydride and phthalic anhydride in a molar ratio of 2 to 0.75 to 1.25 respectively. The polyester composition was formulated from 70 parts of the aforesaid unsaturated alkyd portion and 30 parts of styrene monomer. To this material was added 0.005% hydroquinone as an inhibitor. The resulting solution was then cut of 59% solids content styrene monomer.

In the following Table C, a portion of the above prepared polyester resin was freed of any metallic compounds by the use of sequestering agents. The sequestering agent itself was thereafter removed from the resin. The catalyst used in the following tests was 1% cumene hydroperoxide. As in Table A, the resin was initially at a temperature of 100° F. The resin was placed in a bath at 180° F. and the time necessary to reach both gel and cure was then determined. Table C records the results (A) without any accelerator, (B) with an acid halide as an accelerator but without a metallic compound, (C) with a metallic compound but without an acid halide, and finally (D) with both a metallic compound and an acid halide. The acid halide used was succinyl chloride and the metallic compound was copper naphthenate. P.p.m. indicates parts per million.

Table C

| | Accelerator | | Min. to Gel | Min. to Cure |
| --- | --- | --- | --- | --- |
| | Percent Acid halide | Metal (p.p.m.) | | |
| A | None | None | 69¼ | 88 |
| B | 0.025 | None | 42 | 61 |
| C | None | 1 | 14¼ | 26 |
| D | 0.025 | 1 | 3¼ | 8¾ |

The above table illustrates the importance of the presence of both the metallic compound and the acid chloride for achieving the necessary acceleration.

In the following table, an alkyd was prepared in an identical fashion to that shown in Example 2, except that no sequestering agent was used to remove any metallic ions that migh be present in trace quantities. The following Table D records the results of tests carried out similar to that of Table C. The acid halide and metal were the same as those used in Table C.

Table D

| | Accelerator | | Min. to Gel | Min. to Cure |
| --- | --- | --- | --- | --- |
| | Percent Acid halide | Metal (p.p.m.) | | |
| A | None | None | 37½ | 57 |
| B | 0.025 | None | 10½ | 17 |
| C | None | 1 | 14¾ | 25½ |
| D | 0.025 | 1 | 3¼ | 8½ |

The above Table D is important to illustrate the fact that there may be trace quantities of metallic compounds already present in these resin systems. The metallic compounds may be picked up as trace impurities simply by contact with metals which are oxidized to the corresponding metallic compound. This fact is illustrated by reference to the above table which shows that the acid chloride in the absence of the addition of a metallic compound will accelerate the cure of the composition over and above the rate at which the same composition will cure or gel when the metallic compound is removed by a sequestering agent as in Table C. However, it should additionally be pointed out that the rate of polymerization is more than twice as high when the copper or other metallic compound is added, indicating that metal must be added for optimum results even where present as an impurity. Moreover, it should additionally be noted that the rate of cure is many fold times faster when both the acid chloride and the metal are added, than when neither is added.

The polyester systems of this invention may include other conventional additive materials. Conventional additives such as pigments, lubricants, opacifiers, release agents and plasticizers including stearic acid, tricresyl phosphate, etc. may also be added. In addition, the polyester systems of this invention may have added filler materials such as glass fibers, diatomaceous earth, calcium carbonate, china clays, silicon dioxide, etc.

The polyester systems of this invention are particularly adapted for use in molded structural materials. When used for structural materials, they are ordinarily used with filler materials such as cellulose, glass or wood. The polyesters of this invention are also useful in laminates and in potting compounds. In general, it can be said that the polyesters of this invention are useful in any application where heat-cured polyester resins have heretofore been used.

What I claim as new and desire to secure by Letters Patent of the United States is:

1. A substantially non-aqueous polymerizable composition of matter comprising (1) the esterification product of (a) an ethylenically unsaturated compound selected from the group consisting of alpha unsaturated, alpha, beta polycarboxylic acids and their anhydrides, and (b) dihydric alcohols, (2) a polymerizable monomer containing a polymerizable $CH_2=C<$ group, (3) an organic peroxide catalyst, and (4) an accelerator comprising (a) a trace amount of a metal salt of an organic acid in which the metal is selected from the group consisting of the iron group of the periodic table, copper, manganese, zinc and silver, in an amount of less than 500 parts by weight of the metallic constituent of the metal compound per million parts by weight of (1) and (2) said organic compound being soluble in (1) and (2), and (b) up to about 1.00 percent by weight of an organic carboxylic acid chloride.

2. A substantially non-aqueous polymerizable composition of matter comprising (1) the esterification product of (a) an ethylenically unsaturated compound selected from the group consisting of alpha unsaturated, alpha, beta polycarboxylic acids and their anhydrides, and (b) dihydric alcohols, (2) a polymerizable monomer containing a polymerizable $CH_2=C<$ group, (3) an organic peroxide catalyst, and (4) an accelerator comprising (a) a trace amount of a metal salt of an organic acid in which the metal is selected from the group consisting of the iron group of the periodic table, copper, manganese, zinc and silver, in an amount of from 1 to 500 parts by weight of the metallic constituent of the metal compound per million parts by weight of (1) and (2), said organic compound being soluble in (1) and (2), and (b) from about 0.001 to 1.00 percent by weight of an organic carboxylic acid chloride.

3. The composition of claim 2 in which the metal salt of an organic acid is copper naphthenate.

4. The composition of claim 2 in which the organic acid chloride is the chloride of an aliphatic dicarboxylic acid.

5. A substantially non-aqueous polymerizable composition of matter comprising (1) the esterification product of (a) an ethylenically unsaturated compound selected from the group consisting of alpha unsaturated, alpha, beta polycarboxylic acids and their anhydrides, and (b) dihydric alcohols, (2) a polymerizable monomer containing a polymerizable $CH_2=C<$ group, (3) an organic peroxide catalyst, and (4) an accelerator comprising (a) a trace amount of a metal salt of an organic acid in which the metal is selected from the group consisting of the iron group of the periodic table, copper, manganese, zinc and silver, in an amount of less than 500 parts by weight of the metallic constituent of the metal compound per million parts by weight of (1) and (2) said organic compound being soluble in (1) and (2), (b) up to about 1.00 percent by weight of an organic carboxylic acid chloride and (c) a compound selected from the group consisting of primary, secondary and tertiary amines, hydrohalide salts of the foregoing amines and quaternary ammonium salts.

6. A substantially non-aqueous polymerizable composition of matter comprising (1) the esterification product of (a) an ethylenically unsaturated compound selected from the group consisting of alpha unsaturated, alpha, beta polycarboxylic acids and their anhydrides, and (b) dihydric alcohols, (2) a polymerizable monomer containing a polymerizable $CH_2=C<$ group, (3) an organic peroxide catalyst, and (4) an accelerator comprising (a) a trace amount of a metal salt of an organic acid in which the metal is selected from the group consisting of the iron group of the periodic table, copper, manganese, zinc and silver, in an amount of from about 1 to 500 parts by weight of the metallic constituent of the metal compound per million parts by weight of (1) and (2), said organic compound being soluble in (1) and (2), (b) from about 0.001 to 1.00 percent by weight of an organic carboxylic acid chloride and (c) up to about 0.1 percent by weight of a compound selected from the group consisting of primary, secondary and tertiary amines, hydrohalide salts of the foregoing amines and quaternary ammonium salts.

7. A process for accelerating the rate of polymerization of a substantially non-aqueous polymerizable system comprising (1) the esterification product of (a) an ethylenically unsaturated compound selected from the group consisting of alpha unsaturated, alpha, beta polycarboxylic acids and their anhydrides and (b) dihydric alcohols, and (2) a polymerizable monomer containing a polymerizable $CH_2=C<$ group, said process comprising carrying out the polymerization in the presence of (3) an organic peroxide catalyst, and (4) an accelerator comprising (a) a trace amount of a metal salt of an organic acid in which the metal is selected from the group consisting of the iron group of the periodic table, copper, manganese, zinc and silver, in an amount of less than 500 parts by weight of the metallic constituent of the metal compound per million parts by weight of (1) and (2), said organic compound being soluble in (1) and (2), and (b) up to about 1.00 percent by weight of an organic carboxylic acid chloride.

8. A process for accelerating the rate of polymerization of a substantially non-aqueous polymerizable system comprising (1) the esterification product of (a) an ethylenically unsaturated compound selected from the group consisting of alpha unsaturated, alpha, beta polycarboxylic acids and their anhydrides and (b) dihydric alcohols, and (2) a polymerizable monomer containing a polymerizable $CH_2=C<$ group, said process comprising carrying out the polymerization in the presence of (3) an organic peroxide catalyst, and (4) an accelerator comprising (a) a trace amount of a metal salt of an organic acid in which the metal is selected from the group consisting of the iron group of the periodic table, copper, manganese, zinc and silver in an amount of from about 1 to 500 parts by weight of the metallic constituent of the metal compound per one million parts by weight of (1) and (2), said organic compound being soluble in (1) and (2), and (b) from about 0.001 to 1.00 percent by wieght of an organic carboxylic acid chloride.

9. The process of claim 8 in which the metal salt of an organic acid is copper naphthenate.

10. The process of claim 8 in which the organic acid chloride is the chloride of an aliphatic dicarboxylic acid.

References Cited in the file of this patent

UNITED STATES PATENTS

| | | |
|---|---|---|
| 2,472,963 | Singleton et al. | June 14, 1949 |
| 2,740,765 | Parker | Apr. 3, 1956 |
| 2,822,344 | Duhnkrack | Feb. 4, 1958 |

FOREIGN PATENTS

| | | |
|---|---|---|
| 586,397 | Great Britain | Mar. 18, 1947 |